United States Patent
Hirata et al.

(10) Patent No.: US 6,783,242 B1
(45) Date of Patent: Aug. 31, 2004

(54) PROJECTION APPARATUS AND PROJECTION-TYPE IMAGE DISPLAY APPARATUS

(75) Inventors: Koji Hirata, Yokohama (JP); Masahiko Yatsu, Fujisawa (JP); Futoshi Yamasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/186,885

(22) Filed: Jun. 28, 2002

(30) Foreign Application Priority Data

Feb. 19, 2002 (JP) ........................................ 2002-040913

(51) Int. Cl.[7] ........................ G03B 21/14; G03B 21/00; G03B 21/28; G02F 1/1335; G02B 27/12
(52) U.S. Cl. .......................... 353/20; 353/31; 353/33; 353/34; 353/37; 353/81; 349/8; 349/9; 359/639; 359/640; 359/831; 359/834
(58) Field of Search ............................. 353/20, 31, 33, 353/34, 37, 81; 359/639, 640, 831, 834, 488, 495, 496, 500; 349/8, 9

(56) References Cited

U.S. PATENT DOCUMENTS 6,227,670 B1 * 5/2001 Numazaki et al. ............ 353/31
6,478,428 B1 * 11/2002 Yi et al. ........................ 353/20
6,568,815 B2 * 5/2003 Yano ............................. 353/84

* cited by examiner

Primary Examiner—Russell Adams
Assistant Examiner—Melissa J. Koval
(74) Attorney, Agent, or Firm—Townsend and Townsend and Crew LLP

(57) ABSTRACT

A projection apparatus includes a polarizing converter which converts a light beam from a light source to a polarized beam; a color separator which separates the polarized beam into color beams based on wavelength; first through third optical path modifiers each of which modifies an optical path associated with a corresponding one of the color beams; first through third polarized light separators, each of which receives a corresponding one of the first through third color beams from the optical path modifiers; first through third reflective image display elements, each of which receives a corresponding one of the first through third color beams from the corresponding polarized light separator and provides a reflected beam to the corresponding polarized light separator; a color combiner which combines the reflected beams from the reflective image display elements of the polarized light separator; and a projection lens which projects a color image.

3 Claims, 17 Drawing Sheets

PROJECTION APPARATUS AND PROJECTION-TYPE IMAGE DISPLAY APPARATUS

BACKGROUND OF THE INVENTION

In recent years, there has been extensive development of projection apparatus that include: a polarization conversion device; a light-splitting optical system; optical path reflecting means; image display elements; and a projection optical system. The polarization conversion device provides uniform polarization of light from a white light source. The white light source can be: a short-arc metal halide lamp, in which a metal halogenide is sealed in a light-generating tube, the distance between the electrodes is kept short, and the light-emission properties of the metal are used to generate light; a super high pressure mercury lamp, which can easily provide high luminance; a xenon lamp, which provides superior color rendering properties; or the like. The light-splitting optical system separates light into red (R), green (G), and blue (B) components. The red, green, and blue lights are each associated with optical path reflecting means and an image display element. Light from these image display elements are modulated using a video signal, and the resulting light is guided to a color combining optical system formed by combining prisms. This color combining optical system performs superimposition, and the resulting color image is magnified and projected onto a screen by the projection optical system.

These devices require high-precision control of light polarization properties. The polarization beam splitter, which acts as a polarizer and light detector, determines the polarization properties, and therefore greatly affects the image quality of the projected image. For this reason, much research has been done in recent years on improving polarization beam splitter properties.

As an example, a polarization beam splitter includes: a multilayer dielectric film; and a member formed from a translucent material. The absolute value of the photoelastic constant of the translucent member is selected so that it is no more than a predetermined value associated with the wavelength of the incident light projected into the translucent member. Also, the polarized light separation module associated with red (R), green (G), and blue (B) light beams separate the light from the white light source into their associated colors. The base materials used in the optical members of these polarized light separation modules are designed to provide optimal characteristics by providing the lowest absolute value of the photoelastic constant at different wavelengths.

These polarized beam splitters are used as polarizers or light detectors. Various improvements have been made on illumination optical systems to provide efficient and uniform distribution of light beams from the light source. In one implementation, a television image or an image output from a computer is displayed on image display elements arranged in a matrix according to a predetermined vertical/horizontal aspect ratio, e.g., a liquid crystal panel, serving as means for modulating the intensity of the illumination light beam described above. The image displayed by the image display elements is displayed on a projection-type image projector apparatus that uses a projection lens to magnify the image or a "rear" type projection image display apparatus equipped with a screen on which to show magnified and projected images.

A screen aspect ratio of 4:3 (horizontal:vertical) is common for image display elements used to display computer screens. For displaying television images, the increase in digital cable broadcasts in the North American market and BS digital broadcasts in Japan has led to the growing popularity of an aspect ratio of 16:9 (horizontal:vertical) over the conventional 4:3 (horizontal:vertical) aspect ratio.

SUMMARY OF THE INVENTION

As described above, the absolute value of the photoelastic constant of the translucent member is selected so that it is no more than a predetermined value associated with the wavelength of the incident light projected into the translucent member. Also, the polarized light separation module associated with red (R), green (G), and blue (B) light beams separate the light from the white light source into their associated colors. The base materials used in the optical members of these polarized light separation modules are designed to provide optimal characteristics by providing the lowest absolute value of the photoelastic constant at different wavelengths. However, these methods are not adequate. Due to non-uniformity in the polarized light after the light passes through the polarizing beam splitter, the quenching ratio of the S-polarized light and the P-polarized light is reduced, leading to color and luminance unevenness in the magnified projected image on the screen.

While various methods have been used to provide optimal characteristics in the illumination optical system and the color combining system described above, the efficiency of the technology is still inadequate in practice.

Furthermore, no effective method for controlling the screen display positions of the image lights from the R, G, B image display elements has been established for implementations where the projection apparatus described above is installed in a "rear" image display apparatus so that the magnified projection image is projected via a reflecting mirror onto a transmissive screen disposed at a predetermined position of a cabinet.

A first object of the present invention described above is to provide a projection apparatus with minimal unevenness of color and luminance in a magnified image projected to a screen. A second object is to provide an illumination optical system and a color combining optical system that can make efficient use of light beams generated from a light source. A third object is to provide optimal display positions for image display elements corresponding to red, green, and blue images, when the projection apparatus of the present invention is installed in a rear-projection image display apparatus.
[Means for Solving the Problems]

In order to overcome the problems described above, the present invention provides a projection apparatus including: polarized light converting means converting a light beam from a light source to a uniformly polarized wave; color separating means separating converted beam into a first, a second, and a third color beam based on wavelength ranges; first, second, and third optical path modifying means modifying optical paths associated with separated colors; first, second, and third polarized light separating means receiving color beams for which optical paths have been modified by optical path modifying means; first, second, and third reflective image display elements receiving first, second, and third color beams from polarized light separating means and outputting reflection beams from polarized light separating means; color combining means combining reflected beams from the reflective image display elements received via polarized light separating means; projecting means magnifying and projecting a color image combined by color combining means. First or second or third optical path modifying means is a reflective mirror with characteristics for transmitting long-wavelength light beams with wavelengths of at least 560 nm.

According to another aspect of the invention, color combining means combines reflected beams from the reflective image display elements received via polarized light separating means. Color combining means is formed by joining prisms on which are disposed optical filters selectively transmitting or reflecting light with predetermined wavelengths. The prisms are formed from at least two types of base materials having different wavelengths at which an absolute value of a photoelastic constant is lowest.

According to another aspect of the present invention, an an anti-reflection coating is disposed at an air boundary surface between polarized light converting means and the color combining optical system. The reflection prevention film is formed with a lowest reflectivity Rg and Rr, Rg, Rb satisfying the relationship 6>Rr/Rg, 10>Rb/Rg, where Rg is a reflectivity for light having a wavelength of approximately 550 nm, Rr is a reflectivity for light having a wavelength of approximately 630 nm, and Rb is a reflectivity for light having a wavelength of approximately 430 nm.

According to another aspect, the present invention includes: color separating means separating a light beam from a light source into a first, a second, and a third color beam based on wavelength ranges; image display elements receiving the first, the second, and the third color beams from color separating means, surplus image elements that can be activated being arranged outside of an effective display region; color combining means combining color beams from the image display elements; projecting means magnifying and projecting a color image combined by color combining means; a screen installed at a predetermined position and onto which projection image light from projecting means is projected; and at least two light-receiving elements detecting light intensity at the outside of the screen. Detection results from the light-receiving elements associated with the first, the second, and the third projection image lights are used to control an active region for the image display elements.

DETAILED DESCRIPTION OF PREFERRED EMBODIMENTS

Figure 1:
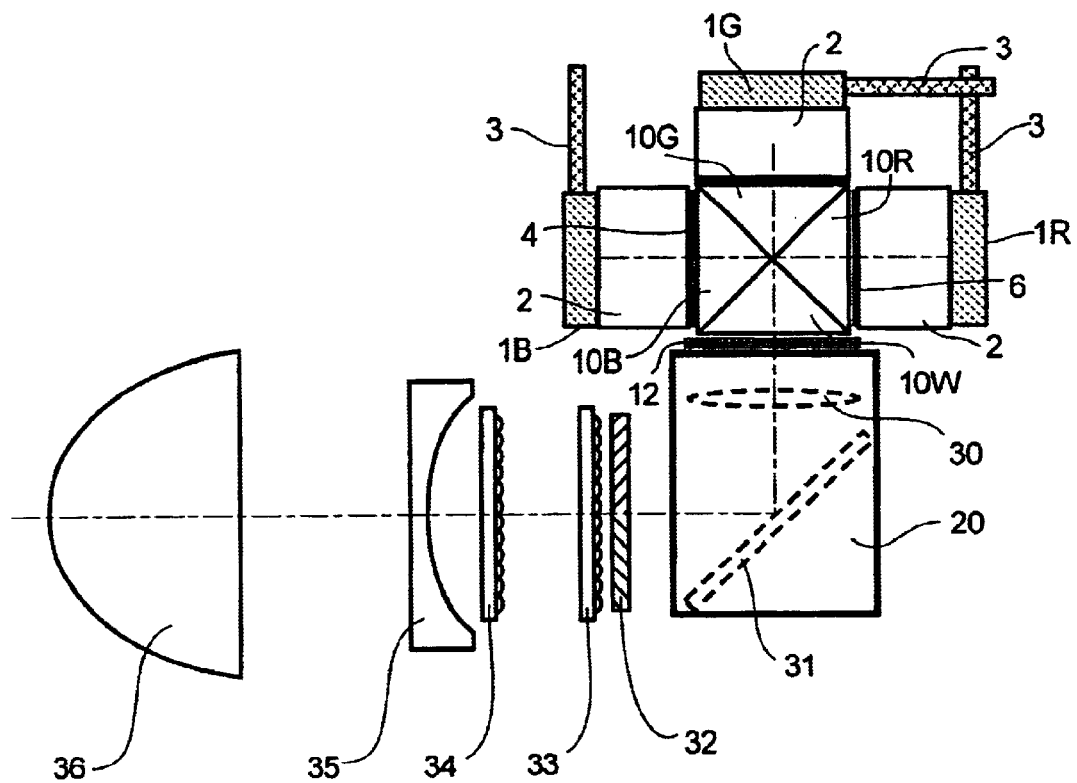
FIG. 1 is a drawing showing the arrangement of a section of an illumination system, a color combining optical system, an image display element, and a projection lens according to the present invention.

The following is a description of the embodiments of the present invention with reference to the drawings. FIG. 1 shows an arrangement of an illumination system, a color combining optical system, image display elements, and a projection lens according to an embodiment of the present invention. In this figure, a light source lamp 36 is a white-light source. The white light generated by the light source lamp 36 is focused (in this embodiment, the reflector of the light source lamp is elliptical) and projected to a beam conversion lens 35. The dispersion performed by the beam conversion lens 35 converts the white-light beam to roughly parallel rays which are projected to a multi-lens array 34. The multi-lens array 34 splits the white-light beam into multiple beams corresponding to the number of lenses in the array. These split beams from the multi-lens array 34 are passed through an associated multi-lens array 33, converted to S-polarized light by a PBS (polarized light conversion element) 32, reflected by an optical path reflection mirror 31, and projected to a field lens 30, where the focal magnification and position are adjusted so that, in the polarized light separation devices 1R, 1G, 1B, the images are reflected magnified and superimposed on the image display element 2 at roughly the same size as the effective screen dimension of the image display element 2. This forms an "afocal" illumination system. For this embodiment, the light will be converted to S-polarized light by the PBS.

Figure 2:
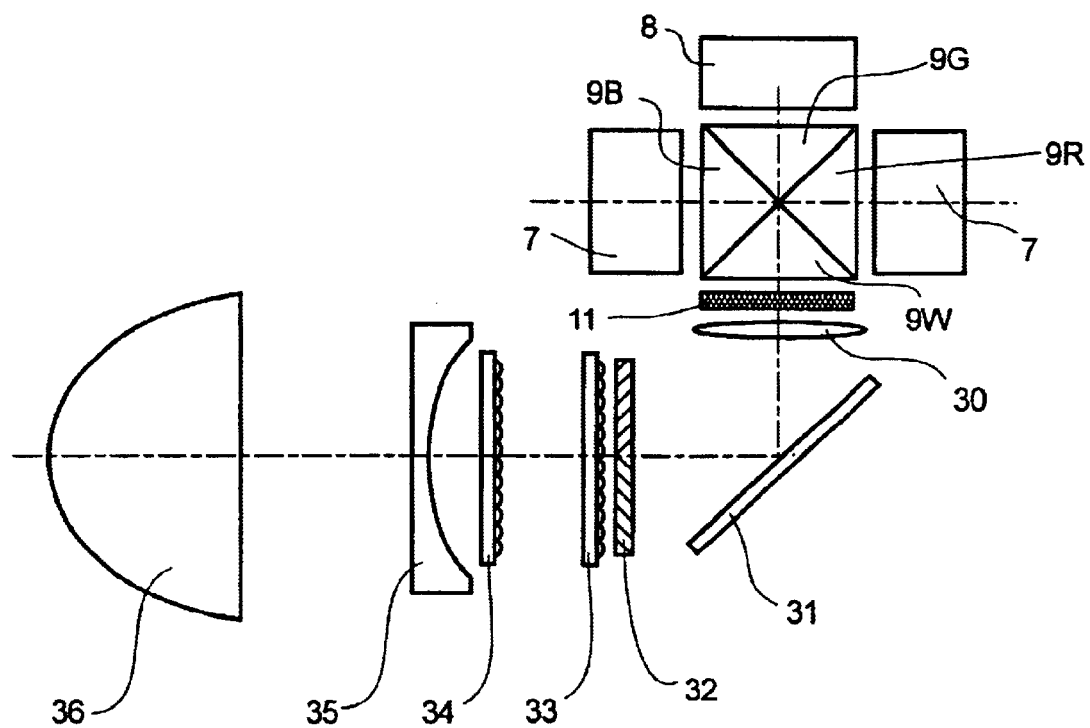
FIG. 2 is a drawing showing the arrangement of an illumination optical system, a polarized light separation device, and a projection lens according to the present invention as shown in FIG. 1.
Figure 25:
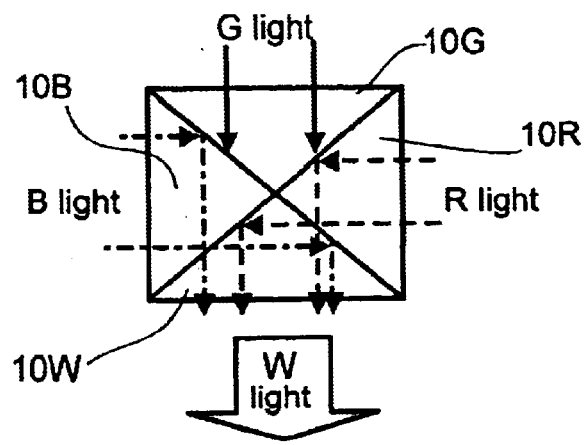
FIG. 25 is a drawing showing the architecture of a color separation optical system according to the present invention.

Thus, the light on the image display element can have a uniform luminous flux distribution. The S-polarized beam split into red, blue, and green beams by the light splitting optical system shown in FIG. 2 are reflected by the polarized light splitting devices 1R, 1G, 1B, respectively. These beams are projected to the image display element 2. A drive signal sent via a flexible terminal 3 modulates intensity according to a video signal, and the resulting beams are converted to P-polarized light and projected. Of these, the red video beam and the blue video beam pass through half-wave plates 4, 6 so that they are converted to S-polarized light. Then, prisms 10R, 10B, 10G, 10W, which form a combining optical system, generate a color image. As shown in a simplified manner in FIG. 25, a red reflective filter is disposed on the reflection surface formed by the contact surface between the prism 10R and the prism 10G, and the characteristics of the red reflective filter causes the red image beam to be reflected toward the projection lens 20. Similarly, a blue reflective filter is disposed on the reflection surface formed by the contact surface between the prism 10W and the prism 10R and the contact surface between the prism 10B and the prism 10G, and the characteristics of blue reflective filter causes the blue image beam to be reflected toward the projection lens 20. Furthermore, the green image beam passes through the corresponding reflective surfaces and are combined with the two other colors, resulting in a color image. The combined color image is sent to the projection lens 20 via the light detector 12 and magnified and projected onto a screen.

FIG. 2 shows an arrangement of an illumination optical system, a color separation optical system, a polarization separation apparatus, and a projection lens according to the present invention. Shared elements are assigned like numerals and corresponding descriptions will be omitted. The polarization of the white light passing through the field lens 30 is made uniform by the polarizer 11, thus improving contrast. This embodiment uses the polarizer 11, but this element can be omitted to reduce costs.

Figure 24:
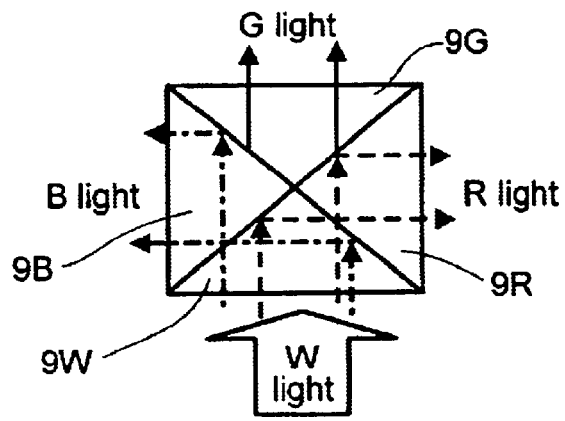
FIG. 24 is a drawing showing the architecture of a color separation optical system according to the present invention.

The white light with uniform polarization from the polarizer 11 is separated into red, blue, and green beams by prisms 9W, 9R, 9B, 9G. As shown in a simplified manner in FIG. 24, the red reflective filter disposed on the reflective surface formed by the contact surface between the prism 9W and the prism 9B and the prism 9R and the prism 9G provides selective reflection of the red component in the white light. The optical path of the red light is then reflected perpendicular to the plane of the figure by a total reflection mirror 7. Similarly, the blue component is selectively reflected by a blue reflective filter at the reflective surface formed by the contact surface between the prism 9W and the prism 9R and the contact surface between the prism 9B and the prism 9G. This blue component is then reflected perpendicular to the plane of the figure by the total reflection mirror 7. The light separated from the red component and the blue component passes through the color separation optical system described above and the green component is selectively reflected by a dichroic mirror 8 and reflected perpendicular to the plane of the figure.

The color combining optical system shown in FIG. 1 is disposed overlapping the color separation optical system from FIG. 2 along the vertical axis. To prevent vertical leakage of light, it would be desirable to have the two systems completely separated by a case wall (bottom surface) or the like.

Figure 3:
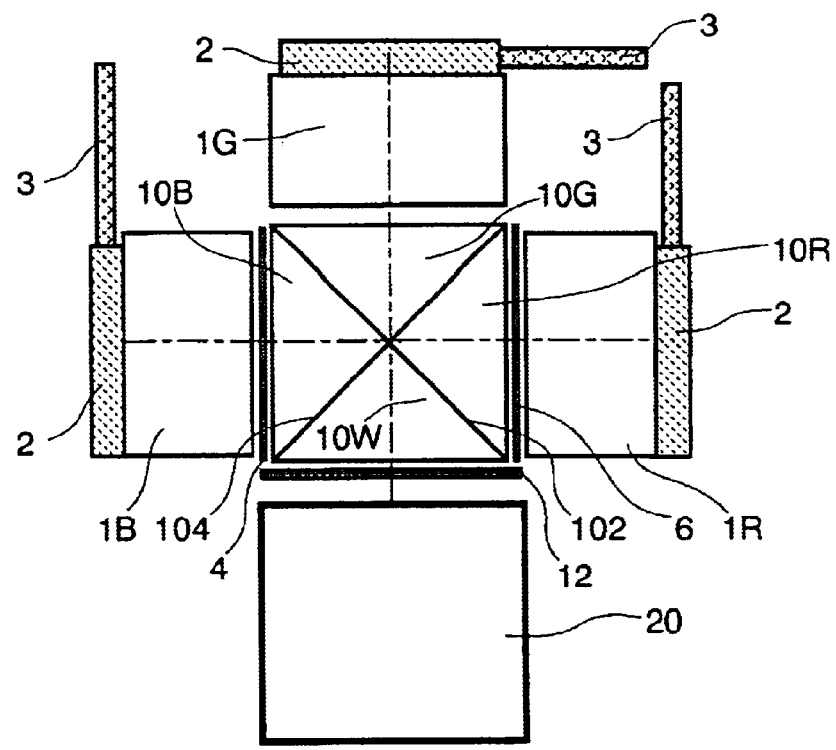
FIG. 3 is a plan drawing showing an embodiment of a color combining optical system according to the present invention.
Figure 4:
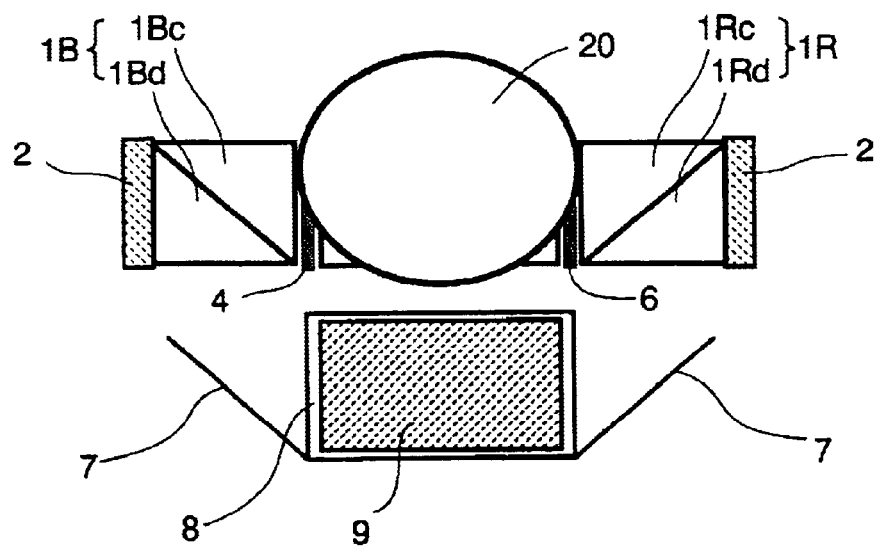
FIG. 4 is a side-view drawing of an embodiment of a color combining optical system according to the present invention as shown in FIG. 1.

FIG. 3 is a plan drawing showing the projection lens and the color combining optical system according to the embodiment of the present invention. FIG. 4 is a side-view drawing of FIG. 3 showing the relative positioning of the color separation optical system and the color combining optical system. Elements in common with those shown in FIG. 1 and FIG. 2 are assigned like numerals and corresponding descriptions will be omitted.

For example, the blue beam separated by the color separation optical system from FIG. 4 is reflected toward a polarized light separation device 1B by the total reflection mirror 7. The light is reflected at the boundary surface between 1Bd and 1Bc and sent to the image display element 2, where it is modulated by the blue video signal and converted to P polarization. The light then goes back to the polarized light separation device 1B and passes through the boundary surface between 1Bd and 1Bc, where it passes through a half wave plate. 4 and is converted to S-polarized light. This light is then sent to the color combining optical system shown in FIG. 3 and is reflected by the blue reflective filter 102 disposed on a reflective surface formed by the contact surface between the prism 10W and the prism 10R and the contact surface formed between the prism 10B and the prism 10G. The resulting light is projected toward the projection lens 20. Similarly, the red beam is reflected toward a polarized light separation device 1R by the total reflection mirror 7. The light is reflected at the boundary surface between 1Rd and 1Rc and sent to the image display element 2, where it is modulated by the red video signal and converted to P-polarization. The light then goes back to the polarized light separation device 1R and passes through the boundary surface between 1Rd and 1Rc, where it passes through a half wave plate 6 and is converted to S-polarized light. This light is then sent to the color combining optical system shown in FIG. 3 and is reflected by the red reflective filter 104 disposed on a reflective surface formed by the contact surface between the prism 10W and the prism 10B and the contact surface formed between the prism 10R and the prism 10G. The resulting light is polarized in a uniform manner by a light detector 12 and projected toward the projection lens 20. Next, the green light beam is passed to the polarized light separation device 1G by the dichroic mirror 8, which transmits long wave light having wavelengths of at least 565 nm. This light is reflected by the boundary surface (not shown in the figure) between 1Gd and 1Gc and projected to the image display element 2, which modulates the light using the green video signal and converts the result to P-polarized light. Color purity is improved through the elimination by the dichroic mirror 8 of yellow components-having a central wavelength of approximately 580 nm. To improve the color purity of the green light, the transmission wavelength of the dichroic mirror 8 can be set to 560 nm and higher.

The green video light beam sent back to the polarized light separation device 1G passes through the boundary surface between 1Gd and 1Gc and is sent as P-polarized light to the color combining optical system shown in FIG. 3, where it passes through a reflective filter disposed on a reflection surface formed by the contact surfaces between the prism 10W and the prism 10B and the prism 10R and the prism 10G. The resulting light is projected toward the projection lens 20. This color combining means provides a color image that is ultimately passed through the light detector 12 to improve polarization and magnified and projected onto a screen by the projection lens 20.

To provide higher contrast properties, two polarized light separation devices can be placed in the optical path corresponding to the green light beam, which has relatively high visibility. More specifically, in place of the dichroic mirror 8 in the first embodiment of the present invention, S-polarized light is sent to a first polarized light separation device (not shown in the figure). The light is reflected to bend the light path and is then sent to a second polarized light separation device 1G. Subsequent operations are similar to those of the first embodiment, and their corresponding descriptions will be omitted. In addition to the green light beam, two-stage polarized light separation can be performed for the red light beam, which has the next highest visibility, and the blue light beam, which has the lowest visibility, in order to provide further contrast.

As shown in FIG. 3, the image display element 2 and the polarized light separation devices 1B, 1G, 1R are directly joined. This results in fewer air boundary surfaces, reducing reflection loss and providing improved mechanical strength for the image display element. Furthermore, by directly joining the image display element, which acts as the object plane, and the polarized light separation device, which is formed from thick translucent media, debris is prevented from adhering to the image display element. This provides the further advantage of preventing loss of image quality in the projected image. Furthermore, by providing a relationship of Sc<Si, where Si is the aperture area on the image display device side of the polarized light conversion device and Sc is the aperture area on the color combining optical system side, it is possible to prevent light with low degrees of parallelism from entering the color combining optical system. As a result, unevenness in color and luminance in the final color image is reduced.

Figure 31:
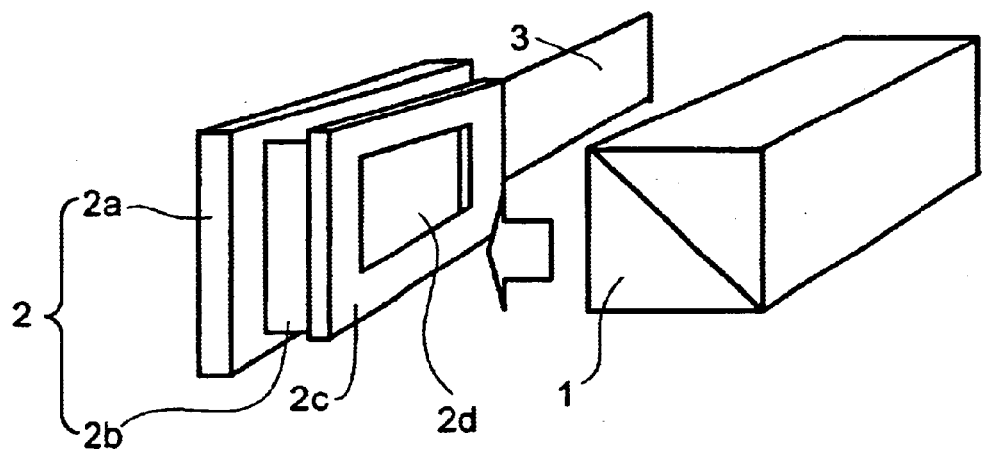
FIG. 31 is a drawing showing how an image display element and a polarized light separating device are joined.
Figure 32:
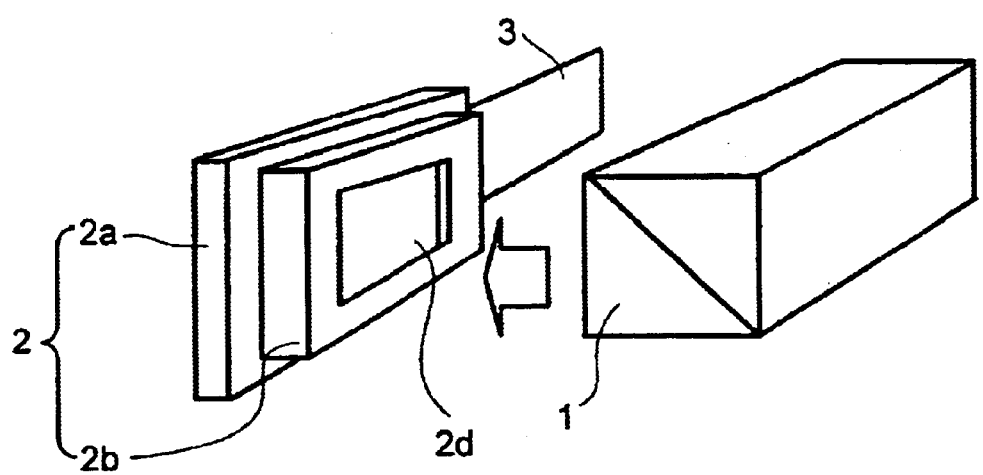
FIG. 32 is a drawing showing how an image display element and a polarized light separating device are joined.
Figure 33:
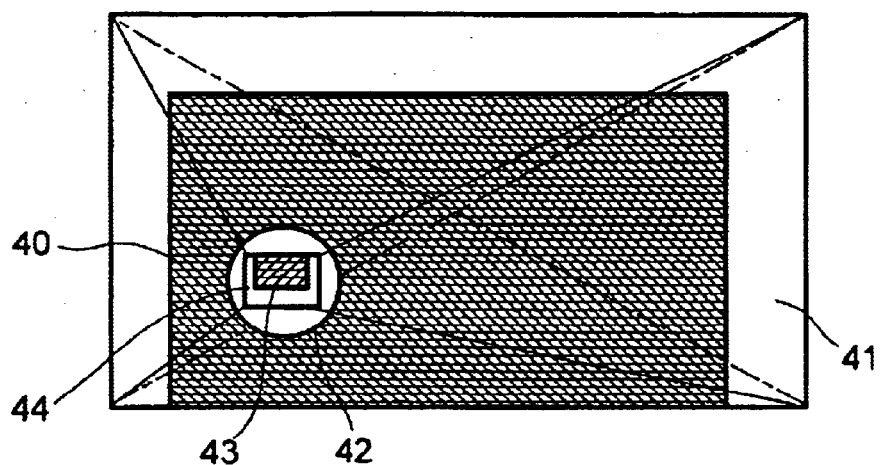
FIG. 33 is a drawing for the purpose of describing the position on a screen of a magnified image from a projection lens.

Specific joining methods for the image display element 2 and the polarized light separation devices 1B, 1R, 1G will be described using FIG. 31 and FIG. 32. FIG. 31 is an external view of the image display element showing the external shape thereof. A thermally conductive adhesive is used to secure a metal substrate 2a to one side of an outer cover 2b, which includes a silicon chip. A protective glass 2d having a thickness of approximately 2 mm is adhesed to the other side of the outer cover 2b. In a first joining method, adhesion is performed to the surface of the protective glass 2d. In a second joining method, adhesion is performed directly to the outer cover containing a silicon chip rather than using the protective glass 2d. This eliminates the protective glass 2d and provides reduced costs.

A polarizing beam splitter is used for the polarized light separation device. This polarizing beam splitter induces birefringence due to optical anisotropy generated by the base material, thus disturbing the polarization the light. Thus, the polarized light separation device reduces the quenching ratio (contrast ratio) for the separation of S-polarized light and P-polarized light, significantly reducing image quality, e.g., through uneven luminance and uneven color after the three colors have been combined. In the present invention, the problems of uneven luminance, uneven color after the three colors have been combined, and the like are reduced by forming the polarized light separation device using base materials that minimize the absolute values of the photoelastic constants for different wavelengths. Also, if cost reduction is a priority, the base material for the polarized light separation device associated with the blue beam, which has a relatively low visibility, can be the same as the base material used in the polarized light separation device associated with the green beam. Examples of base materials having low photoelastic constants over wide wavelength ranges include SF1, SF2, and SF47 from Schott Corp. and PBH55 from Ohara Corp. Ltd. Effects have been confirmed with test samples.

In the embodiments of the present invention, a light detector 12 is placed directly in front of the projection lens 20 in order to provide adequate reduction of unevenness in luminance and color. Improved characteristics can be provided by forming the prisms in the color combining optical system with base materials having low birefringence as in the polarized light separation device described above. Of the optical combining prisms shown in FIG. 3, the prisms 10G, 10W can be formed using base material having the lowest photoelastic constant for light in the green wavelength range, the range with the highest visibility. This provides superior characteristics. Also, further improvements can be provided by forming the prism 10R with a base material having the lowest photoelastic constant in the red wavelength range. Further improvements can be provided by forming the prism 10W with a base material with low photoelastic constants in the green wavelength range and the red wavelength range.

Figure 5:
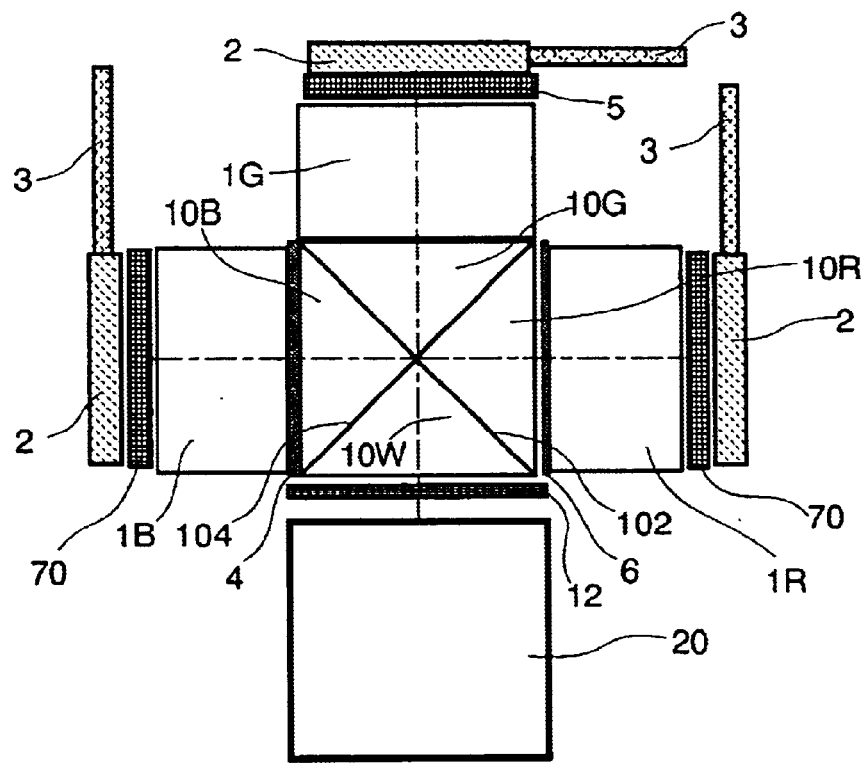
FIG. 5 is a plan drawing showing an embodiment of a color combining system according to the present invention.
Figure 6:
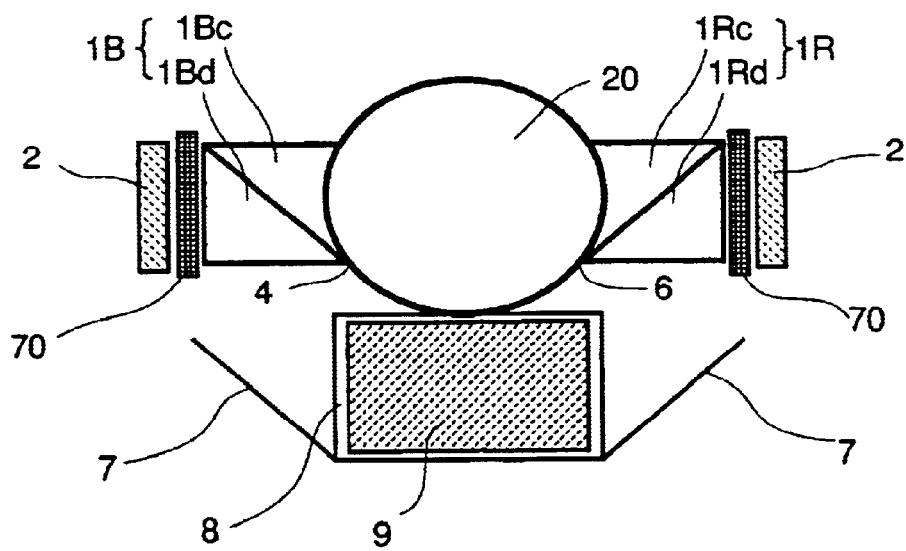
FIG. 6 is a side-view drawing of an embodiment of a color combining optical system according to the present invention as shown in FIG. 3.

FIG. 5 shows a plan drawing of a projection lens and a color combining optical system according to a second embodiment of the present invention. FIG. 6 is a side-view drawing of FIG. 5 showing the relative positioning of a color separation optical system and a the color combining optical system. Elements identical to those from the embodiment shown in FIG. 3 and FIG. 4 are assigned like numerals and corresponding descriptions will be omitted.

The major difference from the first embodiment is the adhesion of the polarized light separation devices 1B, 1R to the prisms 10B, 10R of the color combining optical system interposed by the half-wave plates 4, 6. However, the polarized light separation device 1G associated with the green light beam is directly adhesed to the color combining prism 10G. Good characteristics can be provided by placing quarter-wave plates 70 between the image display element 2 and the polarized light separation devices 1B, 1G, 1R and aligning the polarized light axes with the optimum points. Other operations are similar to those of the embodiment shown in FIG. 3 and FIG. 4 and the descriptions thereof will be omitted.

Figure 7:
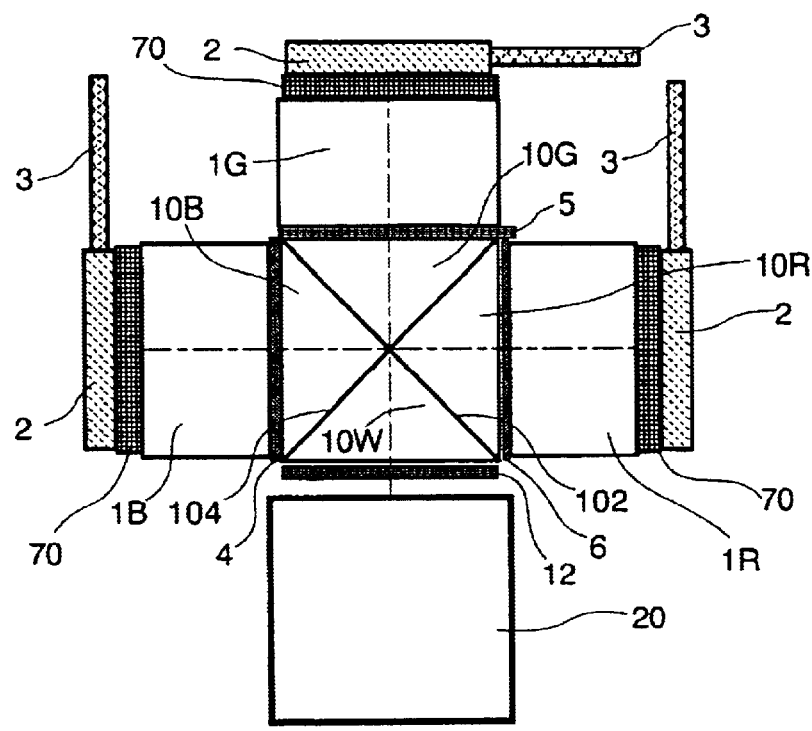
FIG. 7 is a plan drawing showing an embodiment of a color combining system according to the present invention.
Figure 8:
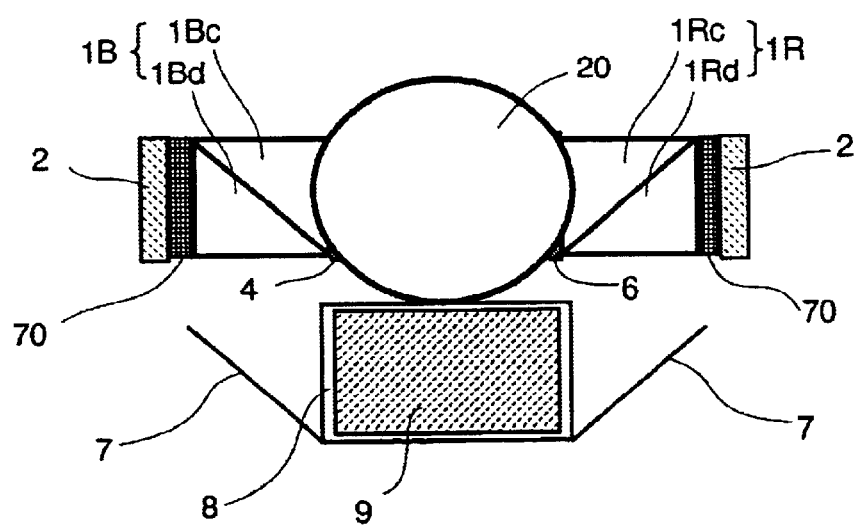
FIG. 8 is a side-view drawing of an embodiment of a color combining optical system according to the present invention as shown in FIG. 5.

FIG. 7 is a plan drawing showing a projection lens and a color combining optical system of a third embodiment of the present invention. FIG. 8 is a side-view drawing of FIG. 7 showing the relative positioning of the color separation optical system and the color combining optical system. Elements identical to those from the embodiment shown in FIG. 3 and FIG. 4 are assigned like numerals and the descriptions thereof will be omitted.

The major difference from the first embodiment is the adhesion of the polarized light separation devices 1B, 1R to the prisms 10B, 10R of the color combining optical system interposed by a half-wave plate. However, the polarized light separation device 1G associated with the green light beam is adhesed directly to the color combining prism 10G. Quarter-wave plates 70 are interposed between the image display elements 2 and the polarized light separation devices 1B, 1G, 1R. The polarized light axes are aligned with optimum points before adhesion. It would also be possible to adhese the light detector 12 to the color combining prism 10W. As a result, unnecessary air boundary surfaces can be reduced, thus reducing a factor in image quality reduction. Other operations are similar to those of the embodiment shown in FIG. 3 and FIG. 4 and the descriptions thereof will be omitted.

Figure 9:
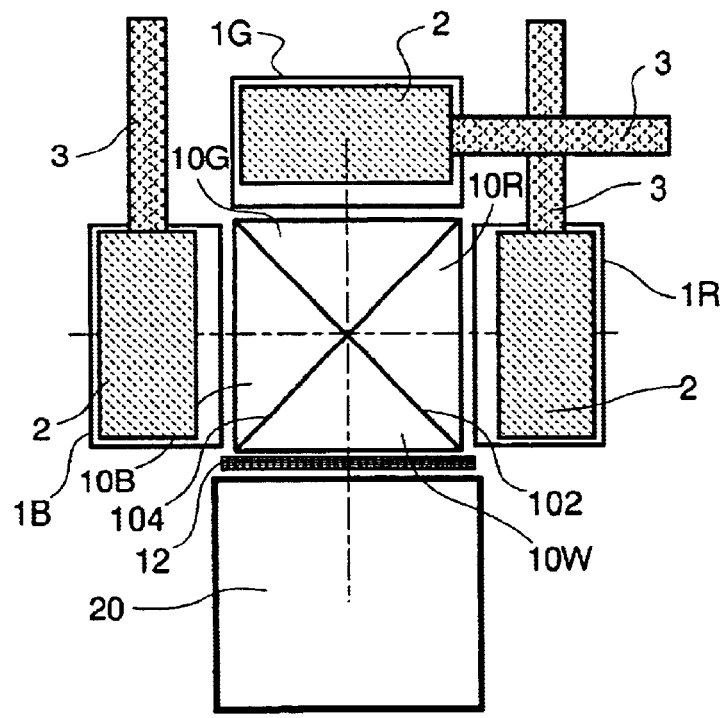
FIG. 9 is a plan drawing showing an embodiment of a color combining system according to the present invention.
Figure 10:
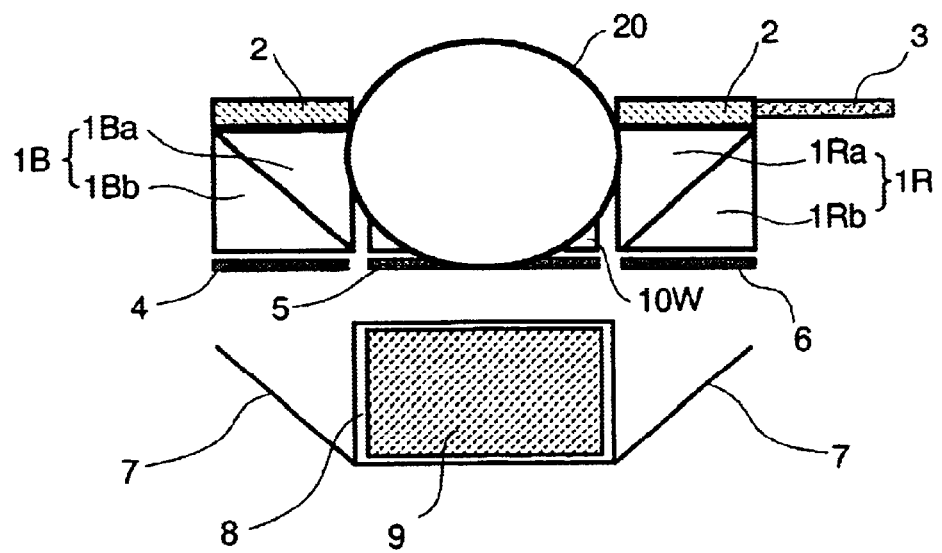
FIG. 10 is a side-view drawing of an embodiment of a color combining optical system according to the present invention as shown in FIG. 7.

FIG. 9 is a plan drawing showing a projection lens and a color combining optical system according to a fourth embodiment of the present invention. FIG. 10 is a side-view drawing of FIG. 9 showing the relative positioning of the color separation optical system and the color combining optical system. Elements identical to those from the embodiment shown in FIG. 3 and FIG. 4 are assigned like numerals and the descriptions thereof will be omitted.

In FIG. 10, the blue beam separated by the color separation optical system is reflected by the total reflection mirror 7 and passes through the half-wave plate 4 to be converted to P-polarized light. This light then enters the polarized light separation device 1B and passes through the boundary surface between 1Bd and 1Bc. The light then enters the image display element 2, where it is modulated by the blue video signal and converted to S-polarized light. The blue video beam then re-enters the polarized light separation device 1B and is reflected by the boundary surface between the 1Bd and 1Bc. The beam is then reflected by a blue reflective filter disposed on a reflective surface formed by the contact surface between the prism 10W and the prism 10R and the contact surface between the prism 10B and the prism 10G. The light is then projected to the projection lens 20. Similarly, the red beam is reflected by the total reflection mirror 7 and passes through the half-wave plate 6 to be converted to P-polarized light. This light then enters the polarized light separation device 1R and passes through the boundary surface between 1Rd and 1Rc. The light then enters the image display element 2, where it is modulated by the red video signal and converted to S-polarized light. The blue [?red?] video beam then re-enters the polarized light separation device 1R and is reflected by the boundary surface between the 1Rd and 1Rc. The beam is then reflected by a red reflective filter disposed on a reflective surface formed by the contact surface between the prism 10W and the prism 10B and the contact surface between the prism 10R and the prism 10G. The light is then projected to the projection lens 20. Next, the green beam is passed to a half-wave plate (not shown in the figure), which performs P-polarization conversion, via the dichroic mirror 7, which transmits long-wave light having wavelengths of at least 565 nm. This light enters the polarized light separation device 1G, passes through the boundary surface (not shown in the figure) between 1Gd and 1Gc, and enters the image display element 2. The light is modulated by the green video signal and converted to S-polarization. The beam re-enters the polarized light separation device 1G and is reflected by the boundary surface between 1Gd and 1Gc. The beam then enters the color combining optical system shown in FIG. 9 as S-polarized light. The beam passes through a reflective filter disposed on the reflective surface formed by the contact surfaces of the prism 10W, the prism 10B, the prism 10R, and the prism 10G, and is then projected to the projection lens 20. The color combining means described above provides a color image and allows the three image display elements 2 to be positioned on the same plane. This simplifies design of air currents when a fan or the like is used to provide cooling.

Also, as shown in FIG. 10, the image display element 2 and the polarized light separation devices 1B, 1G, 1R are directly joined. This results in fewer air boundary surfaces, reducing reflection loss and providing improved mechanical strength for the image display element. Furthermore, by directly joining the image display element, which acts as the object plane, and the polarized light separation device, which is formed from thick translucent media, debris is prevented from adhering to the image display element. This provides the further advantage of preventing loss of image quality in the projected image.

Figure 11:
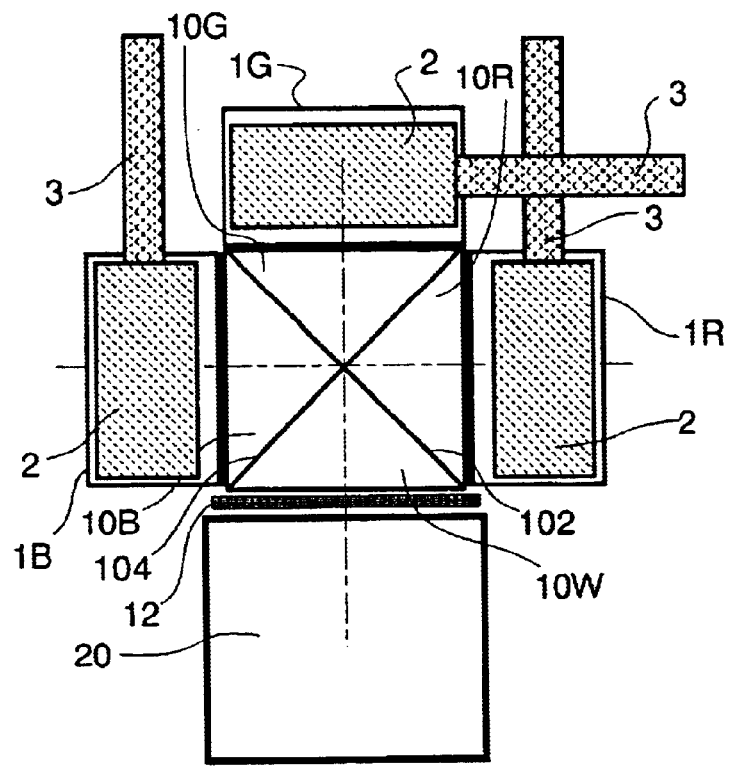
FIG. 11 is a plan drawing showing an embodiment of a color combining system according to the present invention.
Figure 12:
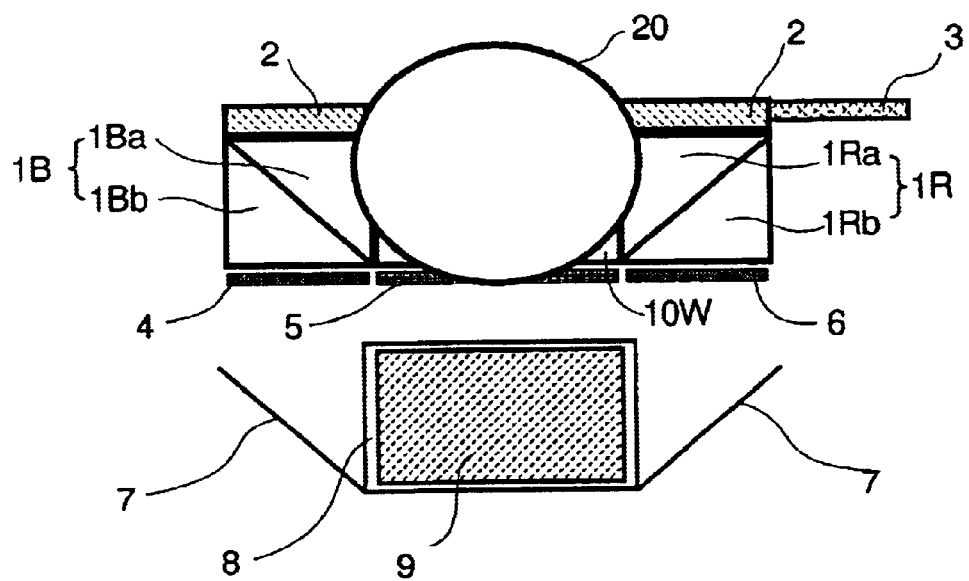
FIG. 12 is a side-view drawing of an embodiment of a color combining optical system according to the present invention as shown in FIG. 9.

FIG. 11 is a plan drawing showing a projection lens and a color combining optical system according to a fifth embodiment of the present invention. FIG. 12 is a side-view drawing of FIG. 11 showing the relative positioning of the color separation optical system and the color combining optical system. Elements identical to those from the embodiment shown in FIG. 3 and FIG. 4 are assigned like numerals and the descriptions thereof will be omitted.

The major difference from the fourth embodiment is the adhesion of the polarized light separation devices 1B, 1R, 1G to the prisms 10R, 10B, 10G of the color combining optical system. The image display elements 2 and the polarized light separation devices 1B, 1G, 1R are also adhesed. Other operations are similar to those of the fourth embodiment shown in FIG. 9 and FIG. 10, and the descriptions thereof will be omitted.

Figure 13:
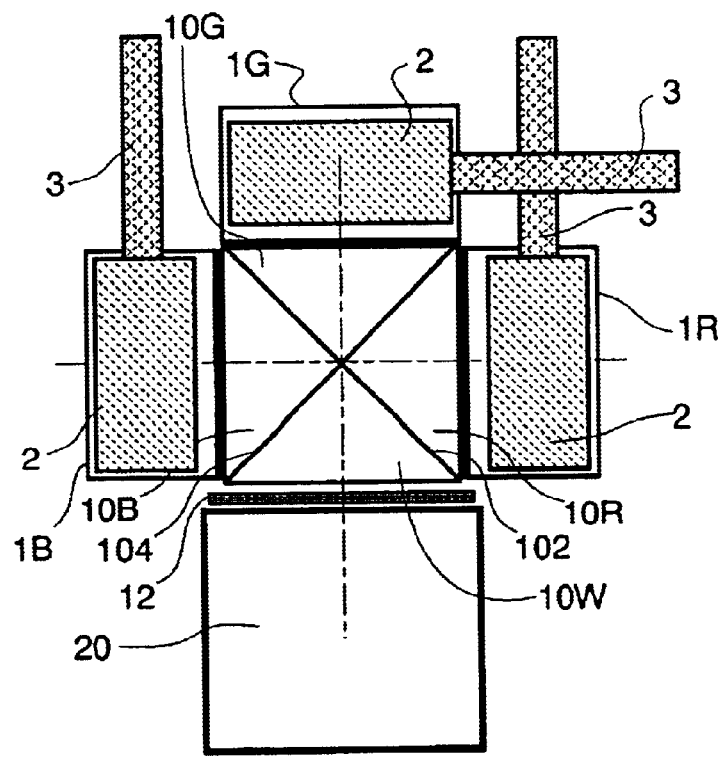
FIG. 13 is a plan drawing showing an embodiment of a color combining system according to the present invention.
Figure 14:
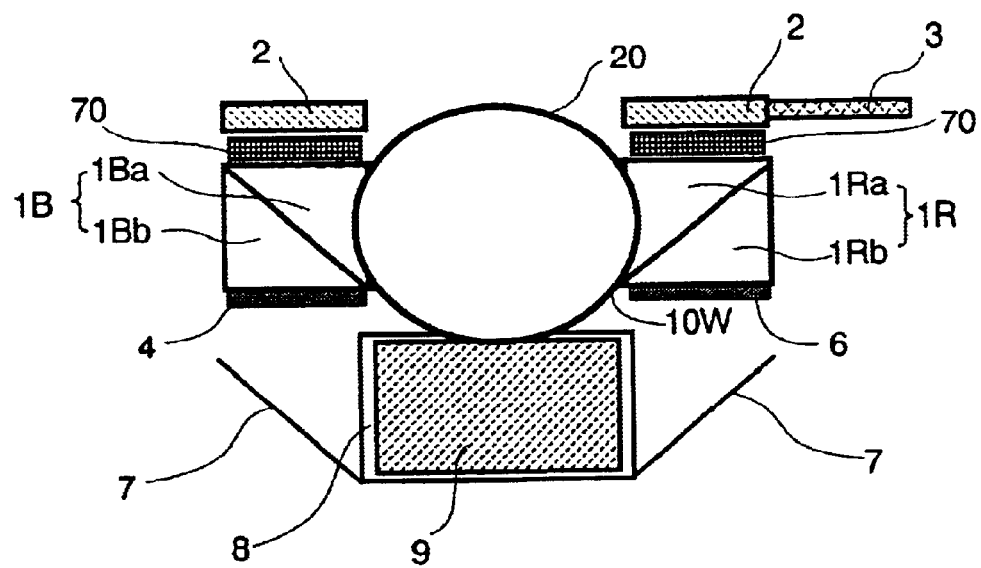
FIG. 14 is a side-view drawing of an embodiment of a color combining optical system according to the present invention as shown in FIG. 11.

FIG. 13 is a plan drawing showing a projection lens and a color combining optical system according to a sixth embodiment of the present invention. FIG. 14 is a side-view drawing of FIG. 13 showing the relative positioning of the color separation optical system and the color combining optical system. Elements identical to those from the embodiment shown in FIG. 9 and FIG. 10 are assigned like numerals and the descriptions thereof will be omitted.

The major difference from the fourth embodiment is the adhesion of the polarized light separation devices 1B, 1R, 1G to the prisms 10R, 10B, 10G of the color combining optical system. The image display elements 2 and the polarized light separation devices 1B, 1G, 1R are interposed by quarter-wave plates 70 with the polarized light axes and optimum points being aligned. Also, half-wave plates 4, 6 (the one for the green beam is not shown in the figure) are adhesed to the polarized color separation device 1B, 1R, 1G.

Figure 15:
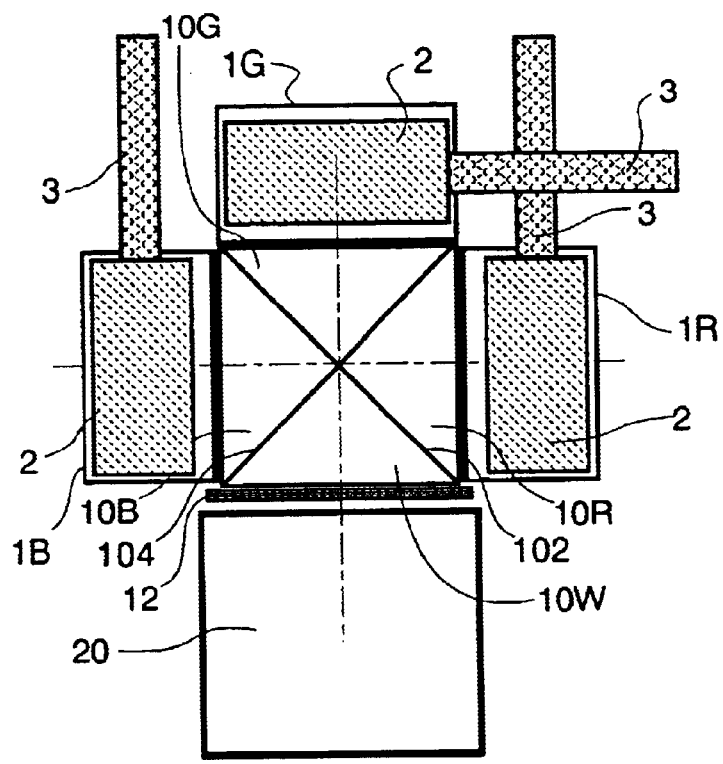
FIG. 15 is a plan drawing showing an embodiment of a color combining system according to the present invention.
Figure 16:
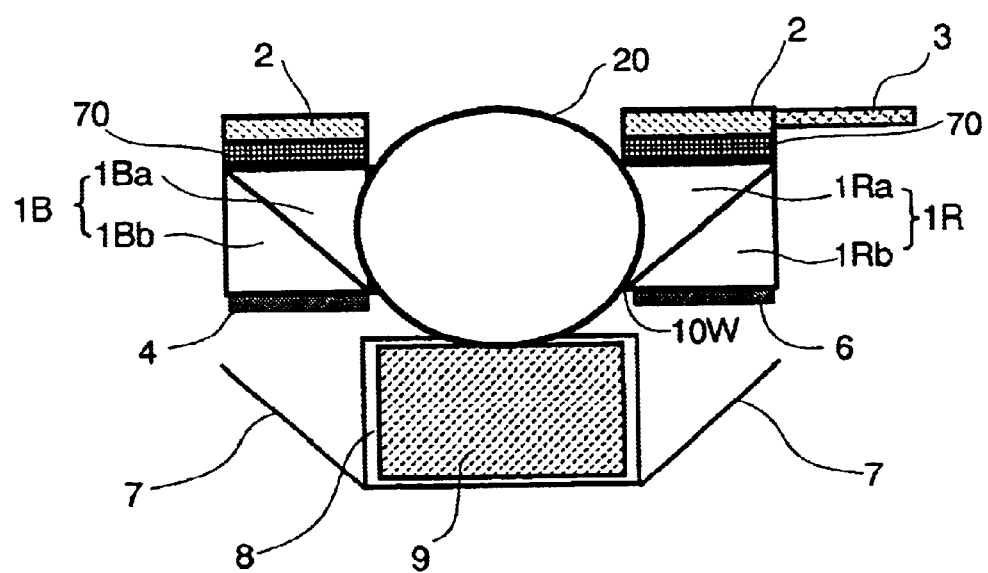
FIG. 16 is a side-view drawing of an embodiment of a color combining optical system according to the present invention as shown in FIG. 3.

FIG. 15 is a plan drawing showing a projection lens and a color combining optical system according to a seventh embodiment of the present invention. FIG. 16 is a side-view drawing of FIG. 15 showing the relative positioning of the color separation optical system and the color combining optical system. Elements identical to those from the embodiment shown in FIG. 9 and FIG. 10 are assigned like numerals and the descriptions thereof will be omitted.

The major difference from the fourth embodiment is the adhesion of the polarized light separation devices 1B, 1R, 1G to the prisms 10R, 10B, 10G of the color combining optical system. The image display elements 2 and the polarized light separation devices 1B, 1G, 1R are interposed by quarter-wave plates 70 with the polarized light axes and optimum points being aligned. These three elements are then adhesed. As a result, there are fewer unnecessary air boundary surfaces, thus reducing a factor in image quality reduction.

Also, the half-wave plates 4, 6 (the one for the green beam is not shown in the figure) are adhesed to the polarized light separation devices 1B, 1R, 1G. Other operations are similar to those of the fourth embodiment shown in FIG. 9 and FIG. 10, and the descriptions thereof will be omitted.

FIG. 17, FIG. 18, FIG. 19, FIG. 20, and FIG. 21 show embodiments of color separation optical systems according to the present invention. Detailed descriptions of operations have been presented above so they will be omitted here.

Figure 17:
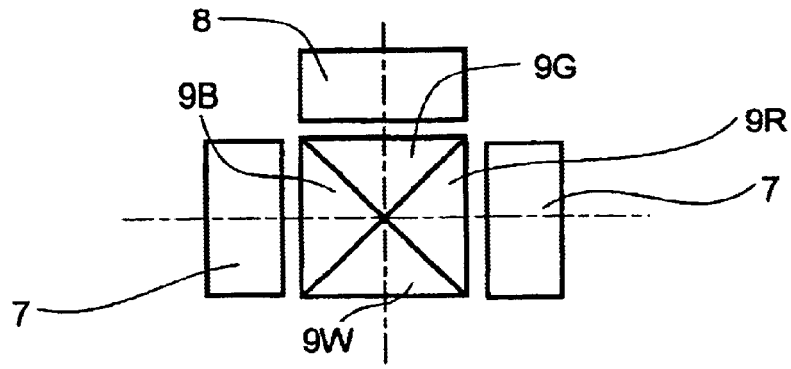
FIG. 17 is a plan drawing showing an embodiment of a color combining system according to the present invention.
Figure 18:
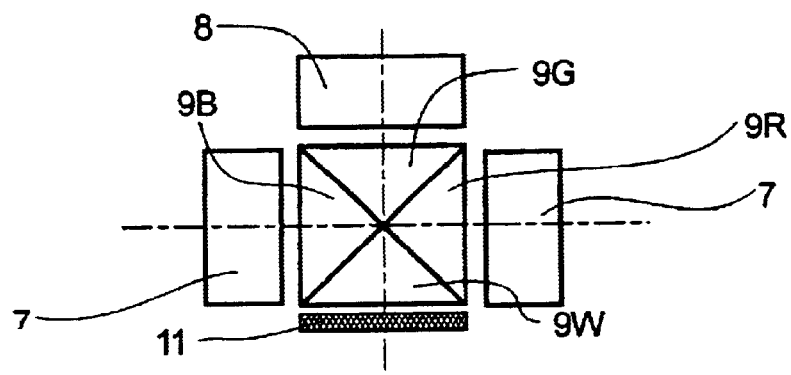
FIG. 18 is a plan drawing showing an embodiment of a color combining system according to the present invention.
Figure 19:
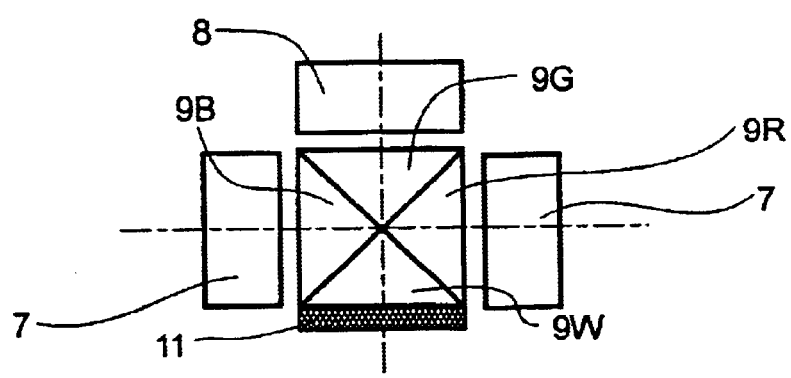
FIG. 19 is a plan drawing showing an embodiment of a color combining system according to the present invention.
Figure 20:
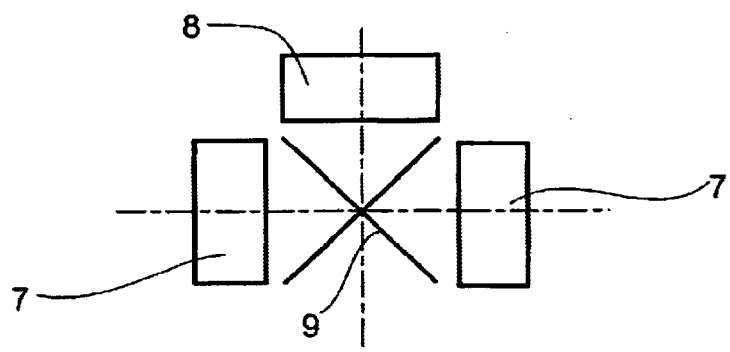
FIG. 20 is a plan drawing showing an embodiment of a color combining system according to the present invention.
Figure 21:
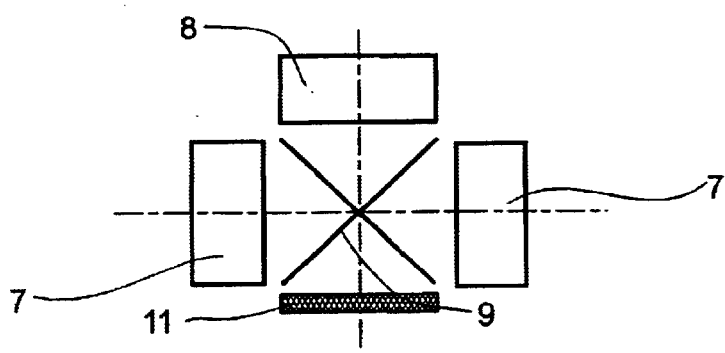
FIG. 21 is a plan drawing showing an embodiment of a color combining system according to the present invention.

FIG. 17, FIG. 18, and FIG. 19 differ in the presence or absence of the polarizer 11 and whether or not the polarizer is adhesed to the color separation prism 11. In the embodiment shown in FIG. 19, the reduction of two air boundary surfaces compared to the embodiment shown in FIG. 18 provides improved optical characteristics. FIG. 20 and FIG. 21 show other embodiments of color separation optical systems in which costs are reduced by using cross-dichroic mirrors 9 in place of the color separation prisms 9W, 9R, 9G, 9B.

Figure 22:
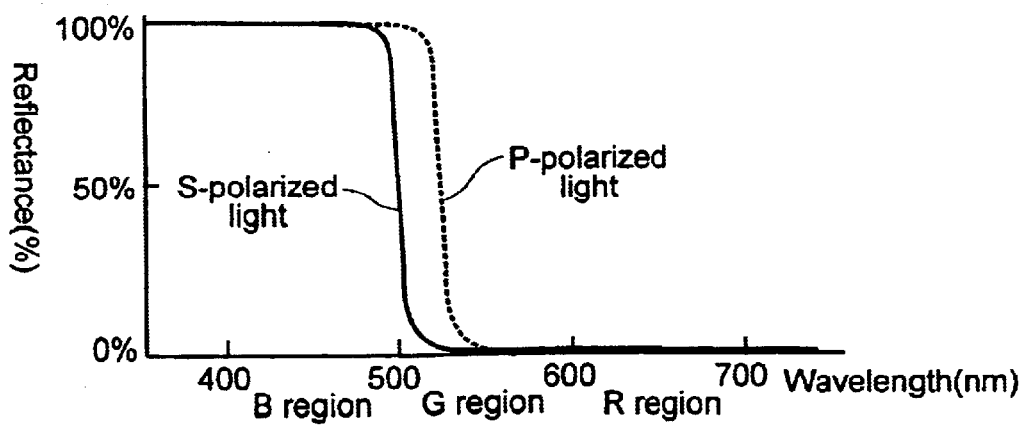
FIG. 22 shows the characteristics of an anti-reflection coating in a color combining/separating optical system.
Figure 23:
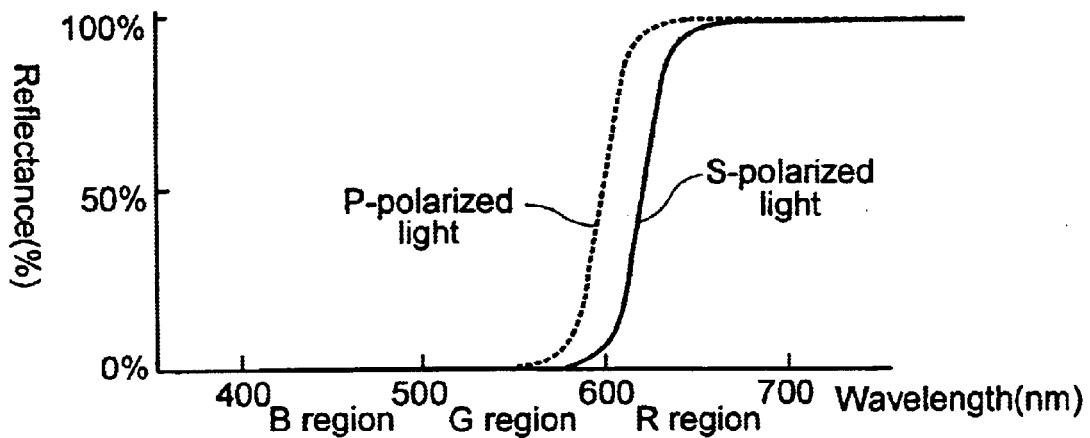
FIG. 23 shows the characteristics of an anti-reflection coating in a color combining/separating optical system.

FIG. 22 and FIG. 23 show standard reflective filter characteristics obtained using multi-layer metal films. FIG. 22 shows filter characteristics for when blue light is transmitted and green and red light are reflected. FIG. 23 shows filter characteristics for when red light is transmitted and blue and green light are reflected. The figures illustrate how characteristics can vary significantly depending on the type of polarization even when the same multi-layer metal film is used. Thus, there will be unevenness in color and luminance in magnified images if light beams with non-uniform polarization axes are passed through color separation/combining optical systems.

Figure 26:
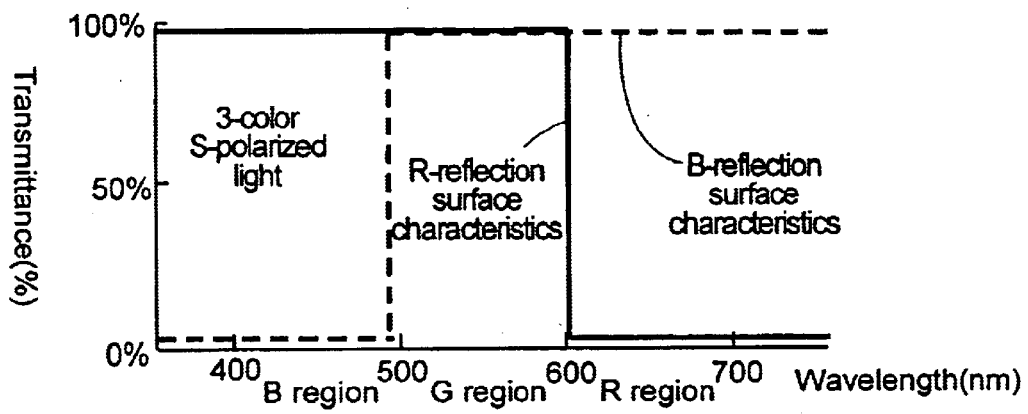
FIG. 26 shows the characteristics of an an anti-reflection coating in a color combining/separating optical system according to the present invention.

In the embodiments of the present invention, the color separation optical system used to separate white light receives S-polarized light. FIG. 26 shows the characteristics of the reflective film disposed on the prism surface of the color separation optical system. With these characteristics, the reflection characteristics in the red wavelength range (600 nm and higher) show a sudden increase, providing good response. The reflection characteristics in the blue wavelength region (490 nm and lower) also show a sudden increase, but the generation of a ripple component in the transmittance in the red wavelength region leads to the need for a greater number of film layers in the reflective film.

Figure 27:
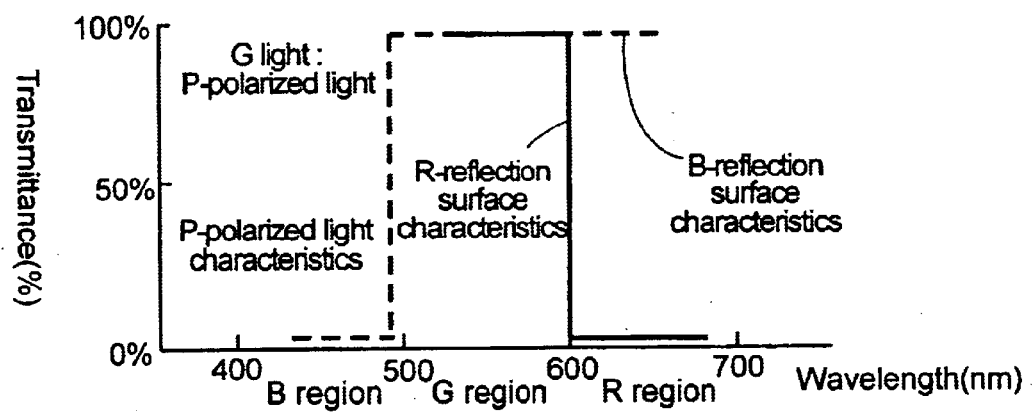
FIG. 27 shows the characteristics of an an anti-reflection coating in a color combining/separating optical system according to a conventional technology.
Figure 28:
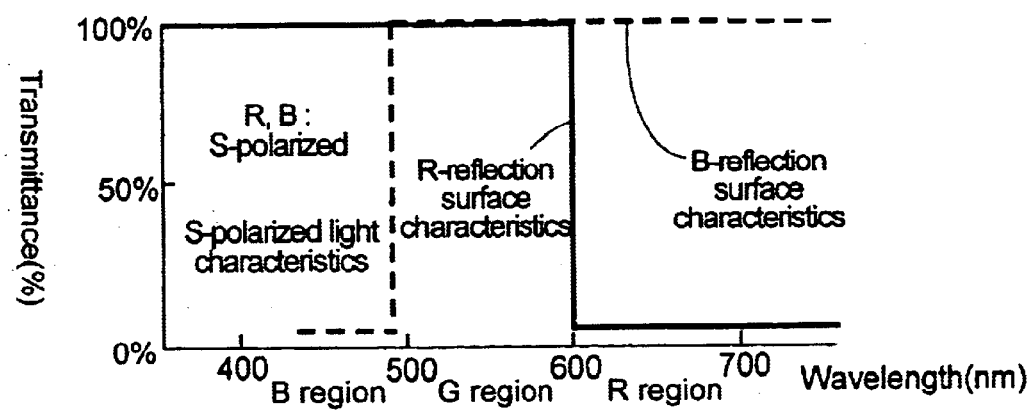
FIG. 28 shows the characteristics of an an anti-reflection coating in a color combining/separating optical system according to a conventional technology.
Figure 29:
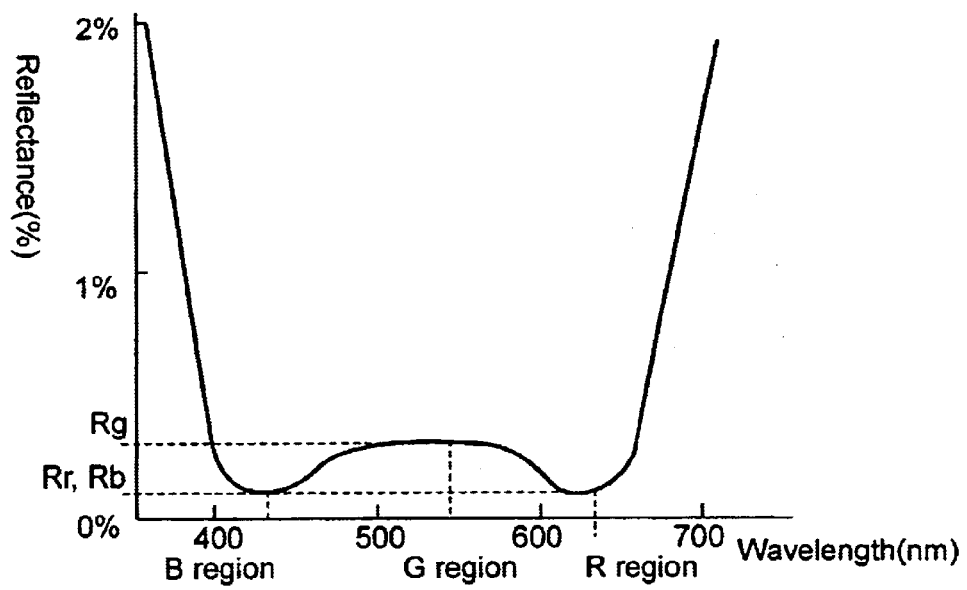
FIG. 29 shows the characteristics of a multilayer reflection prevention film according to a conventional technology.

The image display elements of the present invention modulate light using the video signal and rotate the polarization of the received beam by 180 degrees (S-polarized light to P-polarized light). If the color combining optical system directly converts light in the green wavelength range (between approximately 510 nm and 575 nm) to P-polarized light, responsive characteristics as shown in FIG. 27 can be provided using a small number of film layers. The red and blue beams are passed through half-wave plates to be converted to S-polarized light before entering the optical combining system. This results in good characteristics, as shown in FIG. 28.

Figure 30:
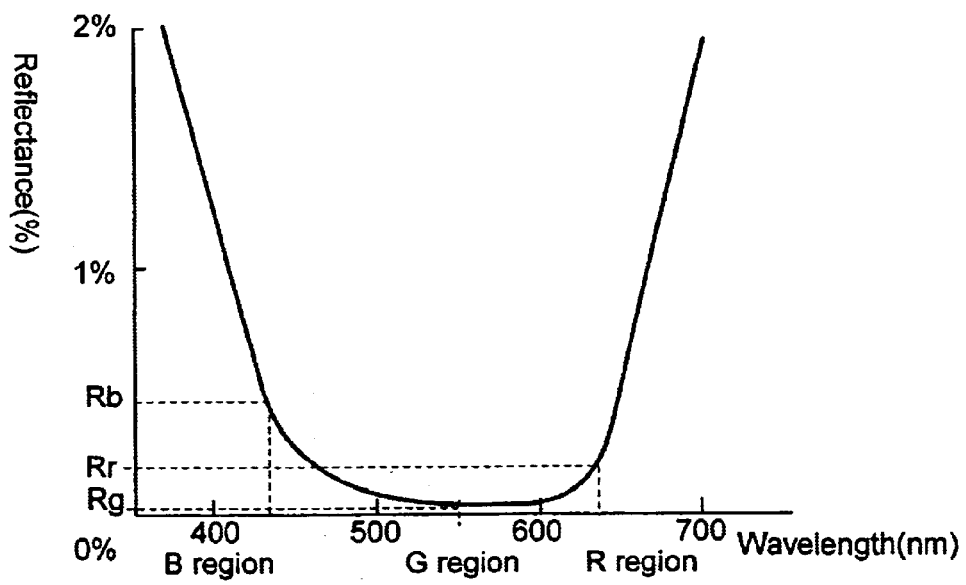
FIG. 30 shows the characteristics of a multilayer reflection prevention film according to a conventional technology.

Conventionally, the reflection-prevention films disposed on the combining prism 10W, the light detector 12, and the projection lens 20 are designed so that reflectivity is uniformly reduced over a wide range. As a result, the green wavelength range (approximately from 510 nm and 575 nm), which is the most visible range, has a higher reflectivity compared to the reflectivity of the red wavelength range (600 nm and higher) and the blue wavelength range (490 nm and lower). In contrast, as shown in FIG. 30, the reflective film in the present invention is designed so that reflectivity is lowest for the most visible green wavelength range (approximately from 610 nm and 575 nm), and the reflectivity is kept low for the red wavelength range (600 nm and higher). This provides improved characteristics. For example, taking visibility into account, overall reflectivity can be reduced by keeping the reflectivity Rr for 630 nm light at six times and the reflectivity Rb for 430 nm light at ten times the reflectivity Rg for 550 nm light.

Figure 34:
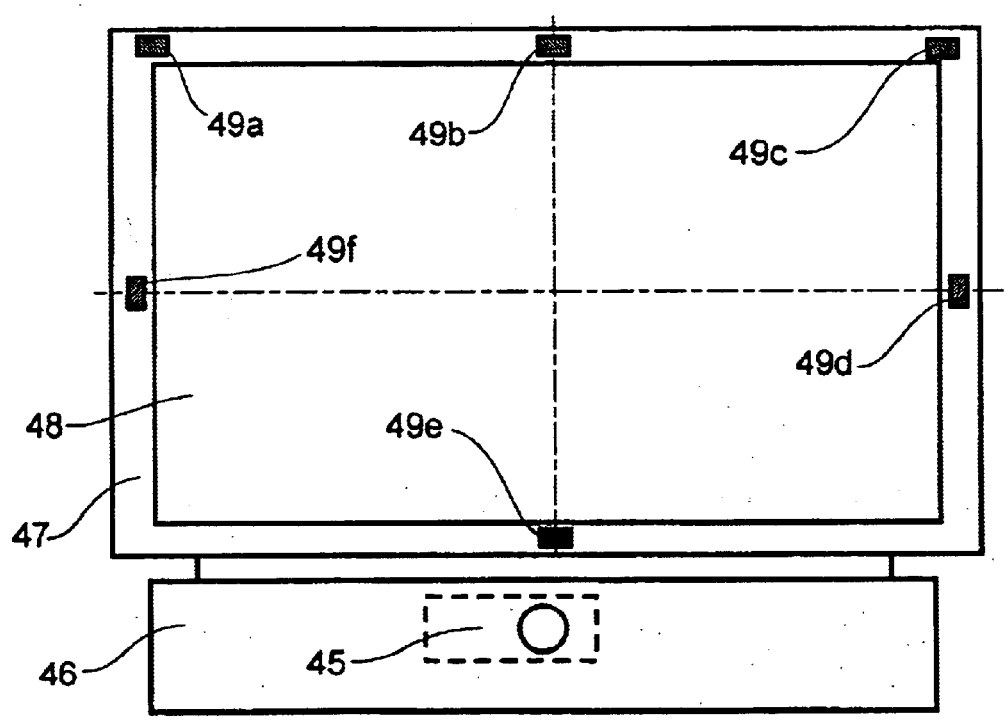
FIG. 34 is a front-view drawing of a projection-type image display apparatus according to an embodiment of the present invention.

FIG. 34 shows a front-view drawing of the main elements in a rear-projection image display apparatus equipped with a projection optical system according to the present invention. The figure shows a projection apparatus 45, a cabinet 46, a screen frame 47, and an effective display range 48 of the screen.

The image display elements in the projection apparatus 45 include a surplus image element region that can be driven outside the effective display range. The projection lens magnifies and projects images, including the surplus image element region, up to an outer screen region 41 to a size greater than the outer dimension of a transmissive screen. Light-receiving elements 49a, 49b, 49c, 49d, 49e, 49f are disposed to the outside of the attachment position of the transmissive screen to convert light intensity to electrical signals. The light-receiving elements 49b, 49e detect horizontal display positioning and the light-receiving elements 49d, 49f detect vertical display positioning. Frame rotation can be calculated using changes in the output signals from the four light-receiving elements. With the light-receiving elements 49a, 49c, frame skewing can also be detected by simply detecting the frame position.

A position detection method will be described in further detail. One or more image elements are sequentially displayed at predetermined positions of the image display elements associated with the red, green, and blue beams. Based on changes in the output signals from the light-receiving elements in response to the display image elements, the optimal display position for the entire frame of the image display elements associated with the color beams is determined, and the activation region is controlled for each image display element. This minimizes color offsetting and raster offsetting resulting from moving the frame display position. With this arrangement, the positioning of optical elements does not need to be adjusted to provide correction for color and raster offsets. This allows high-precision correction to be performed electronically. The adjustments to the active ranges of the image display elements described above are generally performed when the display apparatus is shipped, but it would also be possible for the viewer to perform these operations after purchase. To provide this, an adjustment switch (not shown in the figure) is disposed, and the adjustment operations are started using the switch. Furthermore, it would also be possible to have these adjustments performed at predetermined usage time (viewing time) intervals or each time power is turned on.

Figure 35:
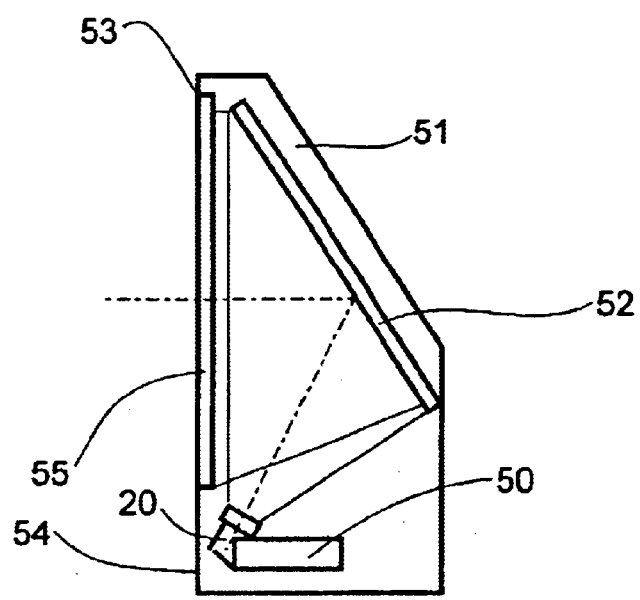
FIG. 35 is a vertical cross-section drawing showing the main elements of a rear projection-type image display apparatus equipped with a projection optical system according to the present invention.
Figure 36:
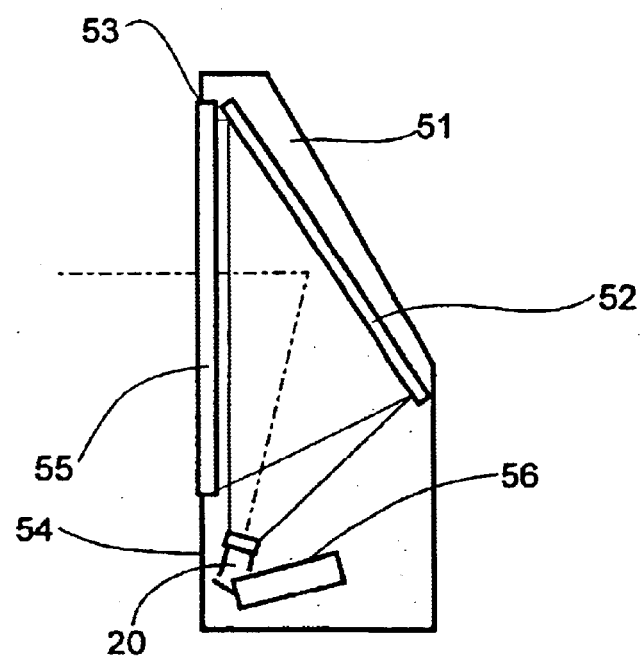
FIG. 36 is a vertical cross-section drawing showing the main elements of a rear projection-type image display apparatus equipped with a projection optical system according to the present invention.

FIG. 35 and FIG. 36 show vertical cross-section drawings of the main elements of a rear-projection image display apparatus equipped with a projection optical system according to the present invention. In FIG. 35, the image obtained from a projection apparatus 50 is magnified and projected by the projection lens 20 onto a screen 55 via a reflection mirror 52. The optical axis of the projection lens 20 is roughly aligned with the center of the outer dimensions of the screen 55, and reflection loss at the edges of the frame due to a fresnel lens is uniform for the four corners. If a color combining optical system of a projection apparatus is to be shared by image display elements having different effective screen sizes, a frame center of a magnified projection image 41 associated with an image display element 44 having the largest effective frame size is aligned with the center of the outer dimensions of the screen. An image display element 43 with a smaller effective frame size (indicated by diagonal shading in the figure) is aligned off-center from the optical axis of the projection lens 42. The resulting magnified projection image 40 has a center position that is offset from the optical axis center of the projection lens. As a result, the setup can be arranged .with less depth. In the figure, there is shown a projection apparatus 56 and a projection lens 20. Other elements identical to those from FIG. 35 are assigned like numerals. The fresnel lens reflection loss at the edges of the frame will vary between the upper and lower ends of the screen, but if the ambient light ratio of the projection lens is no more than 15%, there will be no practical problems with an eccentricity of about 1:3.

A first advantage of the present invention described above is the ability to provide a projection apparatus with minimal unevenness of color and luminance in a magnified image projected to a screen. A second advantage is the ability to provide an illumination optical system and a color combining optical system that can make efficient use of light beams generated from a light source. A third advantage is the ability to provide optimal display positions for image display elements corresponding to red, green, and blue images, when the projection apparatus of the present invention is installed in a rear-projection image display apparatus.

What is claimed is:

1. A projection apparatus comprising:

a polarizing converter which converts a light beam from a light source to a polarized beam;

a color separator which separates the polarized beam into first, second, and third color beams based on wavelength;

a first, a second and a third optical path modifier each of which modifies an optical path associated with a corresponding one of the color beams;

a first, a second and a third polarized light separator, each of which receives a corresponding one of the first, second, and third color beam from the optical path modifiers;

a first, a second and a third reflective image display element, each of which receives a corresponding one of the first, second, and third color beams from the corresponding polarized light separator and provides a reflected beam to the corresponding polarized light separator;

a color combiner which combines the reflected beams from the reflective image display elements of the polarized light separator;

a projection lens which projects a color image from the color combiner; and wherein the color combiner comprises prisms formed from at least two types of base materials having different wavelengths at which an absolute value of a photoelastic constant is a minimum, Sc and Si satisfy the relationship Sc<Si, where Si is an aperture area of the reflective image display element side of the polarizing converter and Sc is an aperture area of the color combiner side.

2. A projection apparatus comprising:

a polarizing converter which converts a light beam from a light source to a polarized beam;

a color separator which separates the polarized beam into first, second, and third color beams based on wavelength;

a first, a second and a third optical path modifier each of which modifies an optical path associated with a corresponding one of the color beams;

a first, a second and a third polarized light separator, each of which receives a corresponding one of the first, second, and third color beam from the optical path modifiers;

a first, a second and a third reflective image display element, each of which receives a corresponding one of the first, second, and third color beams from the corresponding polarized light separator and provides a reflected beam to the corresponding polarized light separator;

a color combiner which combines the reflected beams from the reflective image display elements of the polarized light separator;

a projection lens which projects a color image from the color combiner; and wherein an anti-reflection coating is disposed at an air boundary surface between the polarizing converter and the color combiner, the anti-reflection coating being formed with a lowest reflectivity Rg, and Rr, Rg, Rb satisfying the relationship 6>Rr/Rg, 10>Rb/Rg, where Rg is a reflectivity for light having a wavelength of approximately 550 nm, Rr is a reflectivity for light having a wavelength of approximately 630 nm, and Rb is a reflectivity for light having a wavelength of approximately 430 nm.

3. A projection apparatus according to claim 2 wherein, Sc and Si satisfy the relationship Sc<Si, where Si is an aperture area of the reflective image display element side of the polarizing converter and Sc is an aperture area of the color combiner side.

* * * * *